United States Patent Office 3,475,963
Patented Nov. 4, 1969

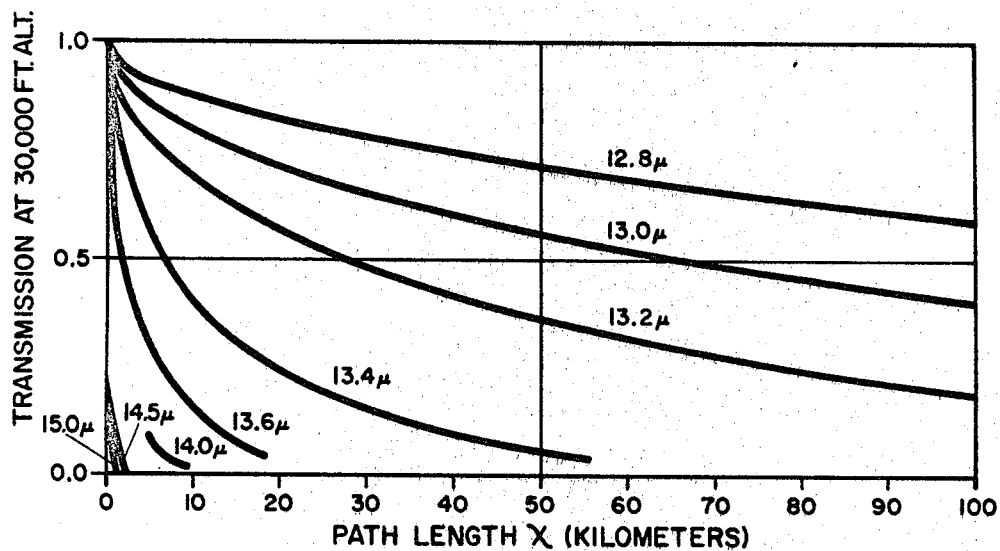
Fig_1
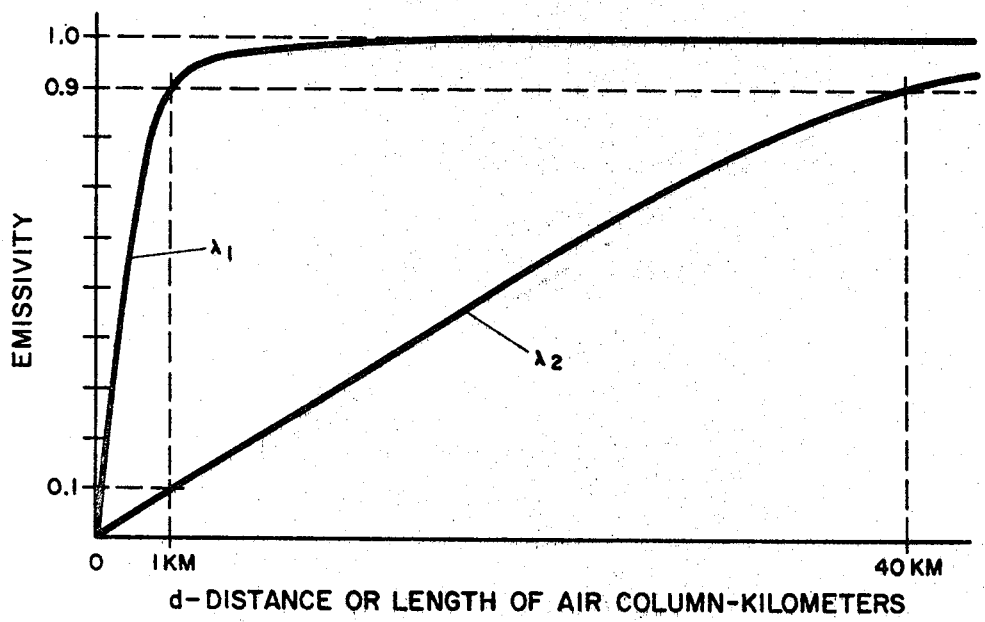
Fig_2
INVENTOR
ROBERT W. ASTHEIMER
BY
ATTORNEY

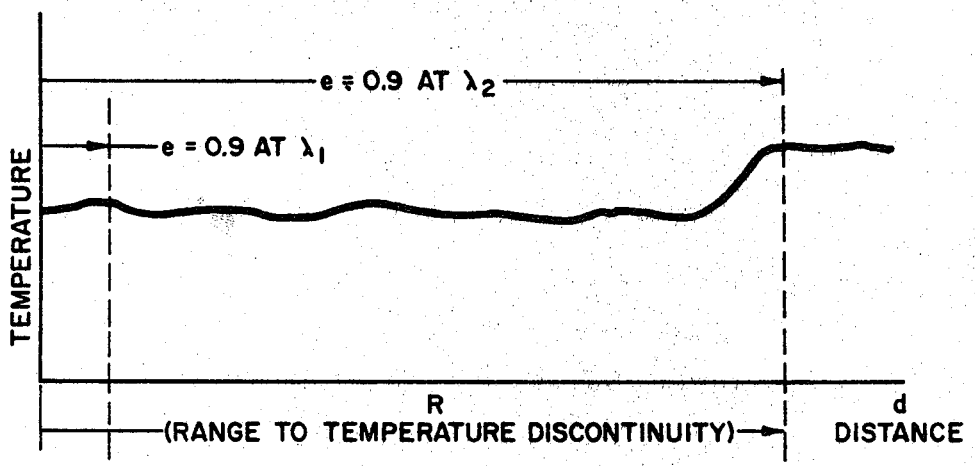
*Fig_3*
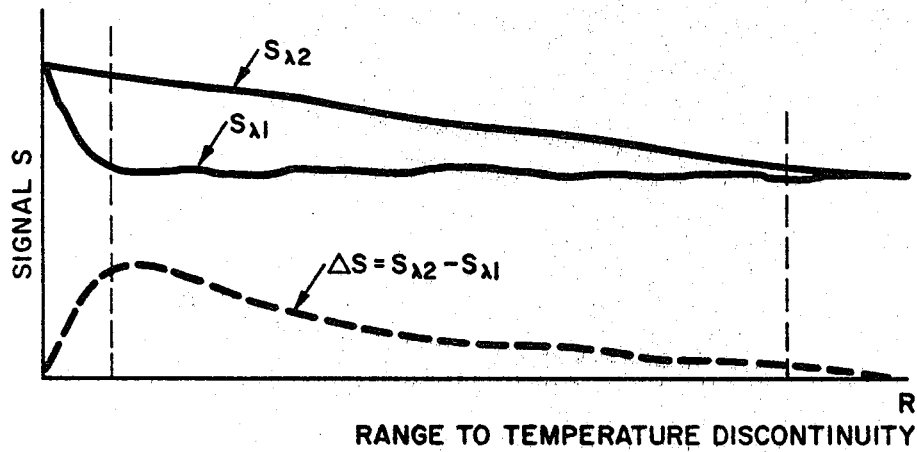
*Fig_4*

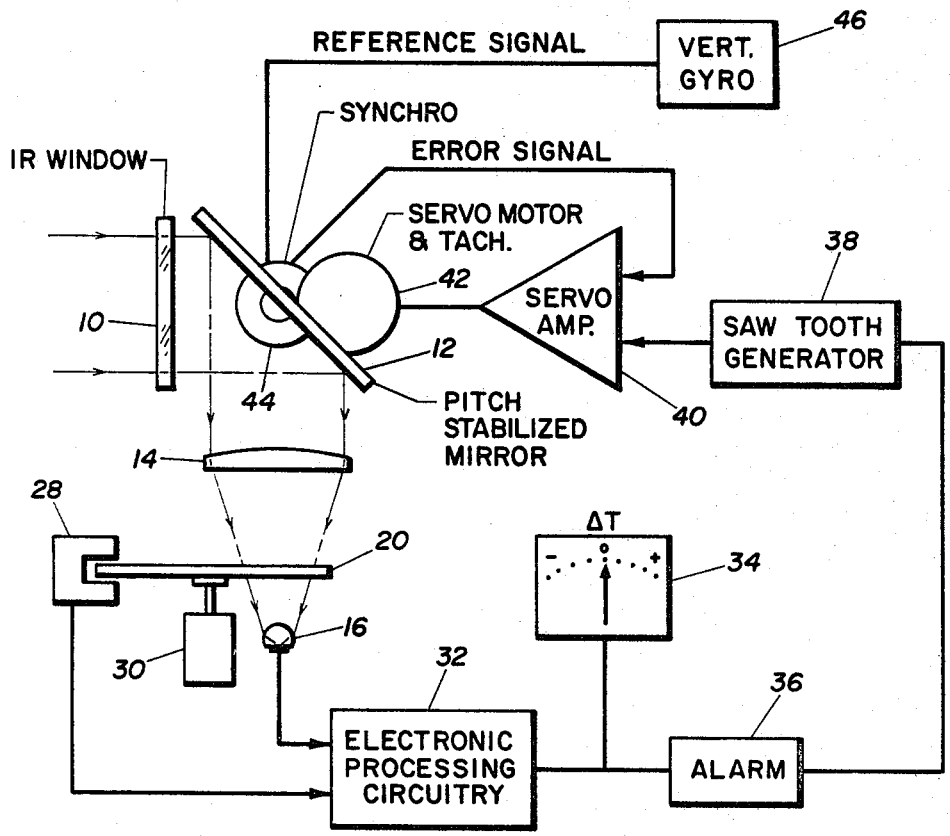
Fig_5
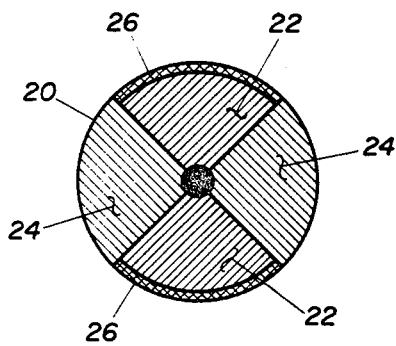
Fig_6

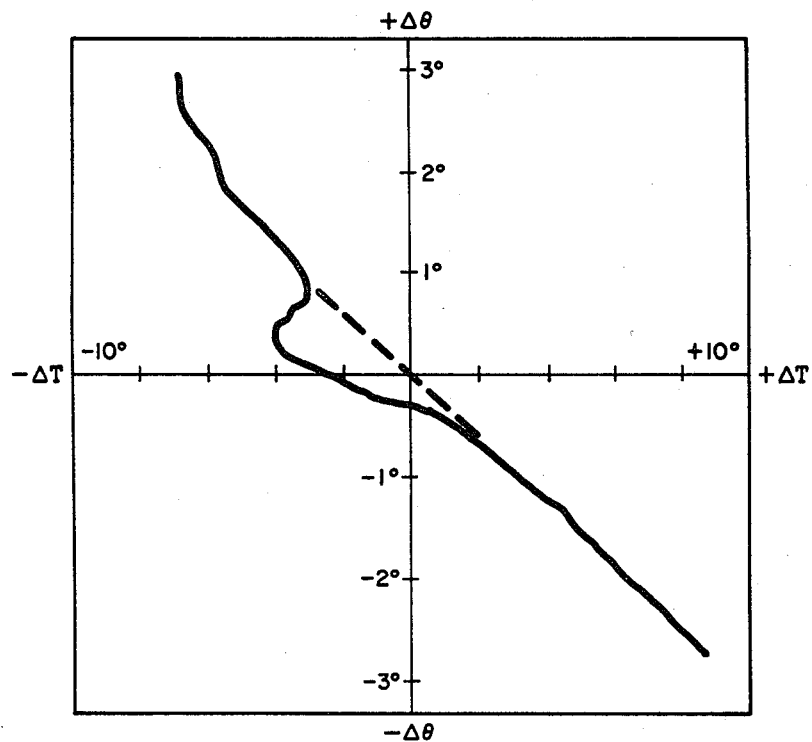
Fig_7

3,475,963
CLEAR AIR TURBULENCE RADIOMETER
Robert W. Astheimer, Westport, Conn., assignor to Barnes Engineering Company, Stamford, Conn., a corporation of Delaware
Filed Feb. 2, 1968, Ser. No. 702,615
Int. Cl. B01k 11/00
U.S. Cl. 73—355             6 Claims

ABSTRACT OF THE DISCLOSURE

A clear air turbulence indicator having a radiometer positioned in an aircraft which views thermal radiation in two narrow wavelength regions, one of which is centered on the 15-micron carbon dioxide band. The output of the radiometer is a difference signal between the two wavelengths, with the 15-micron band being the temperature relatively close to the aircraft while the other band represents the temperature at a distance. The optical system of the radiometer includes a movable mirror which is pitch stabilized with the aircraft to maintain a horizontal line of sight for the radiometer. The instrument also includes a vertical search mode which can be actuated on the receipt of an alarm to indicate whether an increase or decrease in altitude provides a desirable evasive action.

Background of the invention

As the size, speed and cruising altitude of commercial aircraft have increased, clear air turbulence (CAT) has become an increasingly serious problem. One of the difficulties arises from the fact that there is no visual indication of turbulence, as in the case of such atmospheric disturbances as thunderstorms and similar phenomena, where cloud forms provide some visual indication of trouble ahead. Furthermore, the occurrence of CAT is frequently so localized and random that prediction from weather data is not practical for avoiding CAT. Serious injuries have resulted when turbulence is encountered without warning at times when passengers do not have their seatbelts fastened, and in some cases the entire aircraft has been destroyed. It is evident that some air-borne detection system is necessary to provide an advance warning in enough time to permit some corrective action such as the changing of altitude, reducing speed, and fastening seatbelts.

Among the physical phenomena which offer promise for sensing turbulence remotely is air temperature change. Clear air turbulence is associated with abrupt changes in air temperature, on the order of 2° to 5° centigrade. Accordingly, if the air temperature profile along a path extending 20 to 40 miles or more ahead of the aircraft is continuously monitored, identity of CAT regions may be made in time to take corrective measures. The present invention is based on remotely detecting temperature discontinuities in the air.

Summary of the invention

A radiometer having an infrared detector is positioned in an aircraft for remote temperature sensing of the atmosphere, utilizing the thermal radiation emitted by gases in the atmosphere. At least two different wavelengths of radiation emitted by the atmosphere are alternately applied to the infrared detector, with one of the wavelengths being centered on the 15μ carbon dioxide band which provides a temperature close to the aircraft, while the other wavelength is designed to pass radiation more distant from the aircraft, and a difference signal is generated when the distant thermal discontinuity exists. The radiometer includes optical means having a movable mirror element for directing radiation from a horizontal line of sight of the atmosphere onto the detector. Means are provided for stabilizing the horizontal line of sight by pitch stabilizing the mirror in the optical system, and means are provided for indicating the difference signal as well as an alarm when a predetermined signal difference is measured by the radiometer. The radiometer also includes a vertical search mode which may be utilized on the receipt of an alarm signal.

Brief description of the drawings

FIG. 1 is a graph of transmission vs. path length for a plurality of different vavelengths indicating the transmission of the atmosphere at 30,000 ft. altitude.

FIG. 2 is a graph of emissivity vs. distance for two wavelengths on the edge of the 15μ carbon dioxide absorption band.

FIG. 3 is a graph of temperature vs. range to a temperature discontinuity in the atmosphere.

FIG. 4 is a plot of signals vs. range to a temperature discontinuity indicating the type of signal measured by the instrument embodied in this invention.

FIG. 5 is a schematic diagram of an illustrative embodiment of the clear air turbulence detector embodied in this invention.

FIG. 6 is a top view of one form of radiation chopper filter which may be used in the detector shown in FIG. 5.

FIG. 7 is a plot of Δ temperature horizontally vs. look angle vertically, illustrating the vertical search mode displayed graphically of the clear air turbulence detector embodied in this invention.

Description of the preferred embodiments

Before describing an illustrative embodiment of the clear air turbulence detector in accordance with this invention, a brief discussion is first provided of the method of determining thermal discontinuities in the atmosphere, which depends upon the thermal radiation emitted by gases. All materials emit infrared radiation in accordance with the Stefan-Bolzman radiation law. For ideal black bodies the emissivity is unity, and the radiation received by a detector depends only on temperature, and therefore temperature can be readily determined. One of the problems encountered in such measurements is that real materials have emissivities less than unity, and the emissivities may also be spectrally dependent. Gases are peculiar in that their emissivity is usually very low except in certain spectral regions, known as absorption bands, where it is high. In these spectral absorption bands, a sufficient thickness of gas will emit exactly like an ideal black body at the same temperature of the gas, and therefore gas temperature can be determined by radiometric measurement of the infrared energy emitted in appropriate spectral bands. The thermal emission from objects in the range of temperatures encountered in the atmosphere is all in the infrared, principally between 5 and 20 microns. Fortuitously, the carbon dioxide absorption band, centered at 15 microns, coincides with the spectral region of peak emission for black bodies at atmospheric temperatures. Carbon dioxide is uniformly distributed throughout the atmosphere, and is at the same temperature as the air in which it is mixed. Thus, the thermal radiation emitted in a narrow spectral region centered about 15 microns is a convenient measure of air temperature. The present instrument utilizes this spectral region for determining the temperature close to the aircraft. A wide variation in absorption can be obtained by spectrally scanning the wing of the carbon dioxide band from 12μ, where the atmosphere is practically transparent, to 15μ, where the atmosphere becomes completely opaque in a few thousand feet. Accordingly, one can view the atmosphere at varying depths or ranges by choice of spectral wavelengths and temperature discontinuities can be detected as a function of distance or wavelength.

The degree of penetration into the atmosphere at an altitude of 30,000 feet for different wavelengths is illustrated in FIG. 1. It is readily apparent that as the wavelength shifts from 15 microns to 12.8 microns, the path length or penetration into the atmosphere increases markedly. This fact is utilized in the present invention in which the distant air temperature is to be compared to the air temperature at close range. For the close range measurement the receipt of energy centered on the 15 micron carbon dioxide band is ideal. For the distant air temperature, it will be seen on FIG. 1 that to obtain a penetration of approximately 40 miles (63.4 km.) a spectral wavelength on the order of 13.4 microns is indicated.

In order to obtain maximum self-emitted radiation from a gas at a given temperature (black body emission), the depth of the gas must be enough to produce complete absorption or 0 transmission. At a wavelength of high absorption, the depth can be relatively short, whereas at wavelengths of lower absorption the depth must be greater. Accordingly, the absorption coefficient will be high at the center of the band and will fall off rapidly on the edges of the band. This relationship is shown graphically in FIG. 2 for air at two neighboring wavelengths on the edge of the 15 micron carbon dioxide absorption band. One, $\lambda_1$, is of high absorption, and the other, $\lambda_2$, of low absorption. For $\lambda_1$ the emissivity reaches 0.9 in one kilometer, while only reaches 0.1. This means that if we only had a 1 km. long column of air at constant temperature, it would radiate 9 times more at $\lambda_1$ than at $\lambda_2$. On the other hand, if we had an infinitely long column of air, the emissivity reaches unity for both, and equal signals are obtained, except that 90% of this signal comes from the first km. of air at $\lambda_1$, while at $\lambda_2$, 90% of the signal comes from air beyond 1 km. If the atmospheric temperature is constant along the line of sight, equal signals are obtained at the two wavelengths. However, assume that a distant region of higher temperature is approached, as is shown in FIG. 3. The air path lengths for 90% emissivity in the two wavelength regions are indicated. The high temperature region will first be sensed at the $\lambda_2$ wavelength, since most of the signal comes from the distant air. The signal at $\lambda_2$ now exceeds that at $\lambda_1$, and the difference will increase as the high temperature region is approached. FIG. 4 shows a plot of radiometer signals in the two wavelength regions and their difference as a function of range to the temperature discontinuity. This is the principle on which the present invention is based. The instrument measures directly a difference signal between two wavelength regions shown as $\Delta S$ in FIG. 4.

In carrying out this invention in accordance with the above principles and method of operation, reference is now made to FIG. 5 which shows a schematic diagram of a clear air turbulence radiometric detector. The optical system which is illustrated consists of a folded mirror optical system imaging the area ahead of the aircraft on a hyperimmersed thermistor bolometer 16. The optical elements include an infrared window 10, a pivoted flat mirror 12 commonly set at 45° to the horizontal, an objective lens 14, and the immersed detector 16. The basic requirement for the optical elements is that they pass the wavelength of infrared energy to be measured to the thermistor bolometer 16. The optical system as shown is arranged to fit in a small cylindrical housing which will project through a hole in the aircraft fuselage for outside viewing. Many commercial airplanes are now equipped with a sextant lock opening which the present optical system is designed to fit. However, in cases where the folded optical system is not necessary, the system may consist of a pivoted primary mirror in a Cassegrain type optical system.

A chopper 20 driven by motor 30 is interposed between the objective lens 14 and the thermistor bolometer 16. The chopper 20 functions to alternately apply radiation from two different wavelengths to the thermistor bolometer 16. In the illustrated embodiment as shown in detail in FIG. 6 is a four-segment filter wheel having filter pairs 22 and 24 for passing radiation centered on 13.4$\mu$ and on 15$\mu$, respectively. To collect adequate energy, maximum band width should be used, but since radiation is being compared in two spectral intervals, the radiation levels should be balanced to eliminate initial offsets. Accordingly, the band width should be approximately equal in both spectral intervals. In addition, the spectral intervals should not overlap. As was discussed in connection with FIG. 1, the near filter bandwidth should be centered on 15 microns, and should not extend appreciably beyond 14.5, because if the band is made too wide, excessive penetration would occur for the close temperature. Accordingly, a 1 micron band width for both filters would be a reasonable compromise. The chopper 20 as illustrated also includes magnetic radial strips 26 which are used in combination with a reference signal generator 28 to provide reference signal information to the electronic processing circuitry 32. Although the filters 22 and 24 are shown incorporated in the chopper 20, it should be appreciated that separate split filters could be mounted in front of the detector, with the chopper blade alternately applying energy from the field of view through the different fixed-position filters. The illustrated embodiment is preferred in view of its simplicity.

Signals from the infrared detector 16 are applied to electronic processing circuitry 32 along with reference signals from the reference signal generator 28. The function of the electronic processing circuitry 32 is to amplify and synchronously demodulate the signals produced by the detector 16 to apply a radiometric output signal to a meter 34 and an alarm 36. The electronic processing circuitry 32 is conventional, and for example may be that used in the precision radiation thermometer PRT–5 manufactured by Barnes Engineering Company. The output meter 34 is a zero-center meter which will deflect in proportion to the radiation difference, and thus the temperature difference occurring in the two spectral regions, passed to the infrared detector 16. The meter will provide an indication not only of the magnitude of the temperature difference, but whether the remote temperature is lower or higher than the nearby temperature. The alarm 36 may be in the form of a lamp or series of lamps which light in accordance with the temperature difference to provide a visual indication of the possibility of turbulence ahead of the aircraft. As the signal gets larger, and lamps progressively light some indication is provided of the severity of the turbulence.

Among the problems which exist in utilizing the infrared technique for detecting clear air turbulence is the problem of variation in ambient temperature. The instrument embodied in this invention takes care of this problem by sensing only the signal difference from distant and near temperature of the aircraft, so that each signal is equally affected by ambient instrument temperature changes, window transmission, electronic changes, etc. Any such changes will affect each signal equally, and therefore will not affect a difference signal output.

Another severe problem is aircraft pitch. Aircraft pitch causes the line of sight to become nonhorizontal, and because of the normal atmospheric temperature lapse rate, the instrument senses warmer air in the distance if pitched down, or colder air if pitched up. This is not an instrument error, since a real temperature difference is still being detected, but it produces large numbers of unwanted signals, and makes it difficult to establish alarm criteria. This problem is dealt with in the present invention by pitch stabilizing the pivotal mirror 12 to maintain the horizontal line of sight of the instrument. The folding mirror 12 comprises a part of a miniature position servo mechanism which acts to stabilize the optical line of sight in pitch so that the radiometer always looks horizontally independently of the aircraft's pitch motions. Pitch reference signals are derived from a vertical gyro 46 already available in the aircraft. However, provision can be made for providing a vertical reference gyro and leveling table assembly if the aircraft gyro signal is not available or suitable for use with the present servo control system. Reference signals from the vertical gyro 46 are applied to an angle sensing synchro 44 which is coupled to the mirror 12. Error signals are generated by the synchro 44 when the aircraft pitches, which are fed to a servo amplifier 40 and from there to a servo motor and tachometer 42 which drives the mirror the correct amount to correct for the airplane pitching.

In operational use the clear air turbulence detector will be used principally in level flight at cruising altitudes. Its field of view is pointed straight ahead and pitch stabilized by command signals from the plane's vertical gyro. In quiet air the difference output signal will be near zero, but when a temperature discontinuity is approached, the output signal of the radiometer will rise until a pre-established level is reached, at which point the alarm 36 will be activated. As pointed out previously, further detailed signal information could be provided by the alarm using a plurality of lamps which successively light as the signal strength increases.

For an aircraft flying at 600 miles per hour, a first CAT warning at 40 miles provides four minutes time for evasive action. Accordingly, when an alarm is given, the seatbelt sign would be flashed, and continuous observation of the radiometer output signal would be made. If the signal grows rapidly, the pilot would slow down to optimum turbulence penetration, or possibly request an altitude change.

Areas of clear air turbulence extend horizontally distances of 50 miles or more, but are often localized vertically to a layer on the order of 1000 feet. Thus, with only a 30 to 40 mile detection range, it is not practical to attempt to avoid such areas by searching horizontally and trying to fly around the turbulent areas. Because of the vertical localization, it is much faster and more effective to change altitude; therefore it would be desirable to put the radiometer into a vertical search mode upon the reception of an alarm.

This is accomplished readily in the present invention because the pitch stabilization mirror 12 has the capability of moving the field of view of the radiometer ±10° vertically. When the alarm 36 is actuated, a sawtooth generator 38 superimposes a sawtooth wave shape of about 5 seconds scan on the pitch command signal to the servo 40. This will cause the mirror 12 to scan vertically.

The appearance of a graphical display of such a vertical search mode is shown in FIG. 7, where the radiometer output expressed at ΔT is plotted horizontal vs. look angle vertically. The center of the display corresponds to the instant altitude and zero difference radiometer signal. The scan is ±3°, which at 30 miles corresponds to ±8000 feet. In the absence of turbulence the output would normally show a relatively smooth decrease in temperature with altitude, caused by the lapse rate. A turbulent region, however, would show up as a bump or irregularity superimposed on this smooth curve. Although only angle of view, not altitude itself, can be indicated, the zero vertical angle position is always the present aircraft altitude. Therefore, the display will indicate whether it is best to increase or decrease altitude and will give a qualitative idea as to how much change is necessary. When a new altitude is reached, it will confirm whether the turbulence strata has been avoided.

The present invention is illustrated using two wavelengths to detect a piece of the temperature profile of a clear air turbulence area with an increasing signal providing some indication of the distance to the discontinuity. This provides the simplest, least expensive approach. However, it will be appreciated that the instrument could be modified to use a number of wavelengths by a plurality of filters to scan spectrally across the wing of the absorption band to provide a more complete temperature profile along the line of sight, if it is deemed necessary.

I claim:
1. A clear air turbulence detector positioned in an aircraft for remote temperature sensing of the atmosphere to determine turbulence therein, comprising:
    (a) an infrared detector,
    (b) filter means positioned in front of said infrared detector having at least two different filters for passing radiation of at least two different infrared wavelengths within the broad 15μ carbon dioxide band, one being in the center of the band in a region of high absorption and the other on the wing of the band in a region of relatively low absorption, to said detector which develops signals in accordance with the radiation applied thereto, said filter means chopping radiation passing therethrough,
    (c) optical means including a movable mirror element for directing radiation from a horizontal line of sight of the atmosphere onto said infrared detector through said filter means,
    (d) pitch stabilization means coupled to said movable mirror for stabilizing the horizontal line of sight of the atmosphere of the infrared detector, and
    (e) means coupled to said detector for indicating the magnitude of the difference of said signals.
2. The clear air turbulence detector set forth in claim 1, wherein said filter means comprises a four segment filter wheel in two pairs for alternately passing radiation of two different infrared wavelengths to said detector.
3. The clear air turbulence detector set forth in claim 1 wherein said infrared detector is an immersed thermistor detector.
4. The clear air turbulence detector set forth in claim 1 wherein said pitch stabilization means comprises:
    (a) an angle sensing synchro coupled to said movable mirror element,
    (b) means for applying a vertical reference signal to said angle sensing synchro,
    (c) a servo amplifier,
    (d) means for coupling signals from said angle sensing synchro to said servo amplifier,
    (e) a servo motor-tachometer coupled to said movable mirror element, and
    (f) means for coupling said servo amplifier to said servo motor-tachometer.
5. The clear air turbulence detector set forth in claim 1 including an alarm coupled to said detector adapted to be actuated on a predetermined level of the difference signal from said detector.
6. The clear air turbulence detector set forth in claim 1 including means for driving said movable mirror in a vertical search mode scan.

References Cited
UNITED STATES PATENTS

| | | |
|---|---|---|
| 3,056,958 | 10/1962 | Anderson. |
| 3,389,256 | 6/1968 | Astheimer. |
| 3,402,295 | 9/1968 | Astheimer. |

LOUIS R. PRINCE, Primary Examiner

F. SHOON, Assistant Examiner

U.S. Cl. X.R.

250—83.3